INVENTORS.
IVAR JEPSON
AND ETCHISON G. LILL
BY George R. Clark
ATTORNEY.

United States Patent Office 3,035,386
Patented May 22, 1962

3,035,386
POWER OPERATED LAWN MOWER
Ivar Jepson, Oak Park, and Etchison G. Lill, Wheaton, Ill., assignors to Sunbeam Corporation, Chicago, Ill., a corporation of Illinois
Filed Nov. 12, 1958, Ser. No. 773,456
14 Claims. (Cl. 56—26)

The present invention relates to lawn mowers, and more specifically to power lawn mowers of the type in which a suitable prime mover is associated with the lawn mower to drive the cutting mechanism and, if desired, to propel the lawn mower over the area to be mowed.

Power lawn mowers have been sold in increasing numbers during each of the last several years, and such lawn mowers are in use today not only on large lawns but on very small lawns. Moreover, they are of several different types. First of all, with regard to the cutting mechanism, there is available what is known as a reel type lawn mower, and also what is known as a rotary type lawn mower, the latter being a lawn mower in which a blade generally parallel with the surface to be mowed is driven at high speed by a suitable prime mover. These power lawn mowers have principally used electric motors and internal combustion engines as the source of power for driving the cutting mechanism, and in many cases for also propelling the mower over the lawn or surface to be cut. In recent years the electric powered lawn mower has become quite popular. It has a great advantage over a mower powered by an internal combustion engine from the standpoint of noise and also from the standpoint of the ease with which the prime mover can be started and stopped. The disadvantage of the lawn mower powered with an electric motor has been the so-called cord problem. In recent years people have learned how to use a power operated lawn mower powered by an electric motor so that the heretofore existing cord problem is no longer considered a problem. In copending Jepson application Serial No. 574,489, filed March 28, 1956, now Patent No. 2,926,478, and assigned to the same assignee as the instant application, there is disclosed and claimed a power operated lawn mower in which an electric motor is the prime mover for driving the cutting mechanism. This lawn mower has gone into extensive commercial use and has proved to be very popular and unusually successful. The lawn mower disclosed in that copending application is of the rotary type. It would be desirable to provide a power operated lawn mower of the reel type which is as successful as the power operated rotary mower disclosed and claimed in the above-mentioned copending application. For certain types of grass, notably the so-called creeping bent type of grass, a reel type lawn mower is superior to a rotary type cutting device. In addition to that, there are numerous householders who feel that reel type lawn mowers are less dangerous than rotary type lawn mowers. Whether or not this is really true is questionable, but it is well settled that there is a great demand for a satisfactory power operated reel type lawn mower which is simple and compact and light in weight so that it can be used satisfactorily by one who has only a relatively small lawn to mow.

Lawn mowers of the reel type comprise a rotatable reel having usually a plurality of blades which move into shearing engagement with a horizontally disposed cutter bar, which cutter bar moves over the lawn at a height which determines the height of cut. The reel and cutter bar are supported on a frame usually comprising end plates connected together by one or more crossbars, and the reel is commonly journaled in the end plates. With such an arrangement relative movement between the reel and cutter bar is necessary to control a close shearing action. In some lawn mowers the reel is mounted in a fixed position in the end plates and the cutter bar is adjustable to a limited extent to keep it in good shearing engagement with the reel. In other lawn mowers of this type the cutter bar is fixed and the reel is mounted on an eccentric or the like so that it may be adjustable relative to the cutter bar. The present invention is primarily concerned with a reel type lawn mower in which the cutter bar is essentially fixed to the frame and the reel is adjustable relative to the fixed cutter bar.

It will be appreciated that in a reel type lawn mower good cutting action is assured only if the reel and cutter bar make proper shearing contact throughout the entire length of the reel and cutter bar. During the cutting of a lawn where the grass is thick and the growth is heavy, the wedging action of the grass between the cutter bar and the reel tends to deflect the center portion of the cutter bar, which is the least supported portion. Obviously, if deflection of the center of the cutter bar occurs, poor cutting or shearing action will result. For this reason cutter bars have been built so as to be supported on a heavy frame which cannot distort. Generally when mowing a lawn, successive paths of the mower are taken so that a slight overlap occurs, which means that the end portions of the cutter bar do less cutting action than the central portion which is always cutting grass. Consequently, there is more wear of the central portion of the cutter bar. Even aside from the wear factor of the center portion, of the cutter bar due to cutting more grass at that portion, there is also the problem caused by vibration. The center of the cutter bar is the least well-supported portion thereof, and if the resonant frequency of the cutter bar is close to the frequency with which the blades pass the cutter bar there is the possibility of excessive and uneven wear of the cutter bar. Thus there is another reason for making the cutter bar rigid so that its resonant frequency of vibration is high relative to the speed of the reel. Unfortunately, when one increases the strength and rigidity of the cutter bar or cutter bar support to avoid the factors enumerated above, the weight of the mower increase and from the householder's standpoint this is very undesirable. In general, although a lawn mower is power driven, there still is a considerable amount of hand manipulation necessary to guide the mower and the like, particularly when the lawn to be mowed has numerous trees, bushes, shrubbery and the like. Consequently, it would be desirable to provide a power operated lawn mower of the reel type provided with a cutter bar which has the features of a rigid, heavy cutter bar without the increased weight.

In any reel type lawn mower the effectiveness thereof is determined by maintaining the cutter bar and reel in constant shearing engagement throughout the entire length thereof. With a heavy reel, a very rigid frame and a very rigid cutter bar this can be accomplished, but a heavy lawn mower results. It would be desirable to provide a lawn mower having a light frame which still provides a very rigid construction where twisting of the frame does not occur and wherein the cutter bar remains very rigid. In addition such lightweight but very rigid frame should be simple to fabricate with the accuracy required so that the manufacturing cost is low.

It would also be desirable to provide an improved reel type lawn mower propelled by an electric motor in which means are provided to insure proper shearing action between the cutter bar and the reel at all times. Thus there would be available a lightweight reel type lawn mower which can be started and stopped merely by the flick of a switch. In any lawn mower it is essential to be able to adjust the height of the cut. Hence, at certain times of the year it is desirable to cut the grass much shorter than at other times. Consequently, it is desirable in a reel type lawn mower to provide simple and foolproof means for adjusting the height of the cut, and simple and foolproof means for adjusting the shearing action between the cutter and the reel, both initially and to maintain this good shearing action as wear on the reel and cutter bar occurs. Actually, a reel type lawn mower is a sort of self-sharpening device if proper adjustment is maintained.

Accordingly, it is an object of the present invention to provide a new and improved power operated lawn mower having the various desirable features set forth above.

It is another object of the present invention to provide a new and improved reel type lawn mower.

It is another object of the present invention to provide a reel type lawn mower having an integral frame of a lightweight metal which provides a very rigid and substantially twistproof construction.

It is another object of the present invention to provide a reel type lawn mower in which improved means are provided for adjusting the reel relative to a cutter bar fixed to the frame.

Still another object of the present invention comprises the provision of an improved reel type lawn mower powered by an electric motor with improved means for adjusting the power drive between the motor and the reel of the lawn mower.

Yet another object of the present invention is the provision of an improved reel type lawn mower with means for maintaining the entire length of the cutter bar in good shearing engagement with the reel.

A further object of the present invention resides in new and improved methods of manufacturing a lightweight yet rigid frame for a reel type lawn mower.

Still another object of the present invention resides in improved means for supplying power to the ground supporting wheels whereby the lawn mower is driven over the area to be mowed.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 13 is an exploded perspective view of a portion of the motor frame and drive mechanism;

FIG. 15 is a fragmentary sectional view taken on line 15—15 of FIG. 3;

FIG. 16 is a sectional view taken on line 16—16 of FIG. 12, assuming FIG. 12 shows the complete structure;

Briefly, the present invention is concerned with a lightweight electric powered reel type lawn mower having a lightweight frame of cast aluminum with a tubular steel insert to give it strength and rigidity without increasing the weight. The cutter bar is fixed to the frame, and means are provided to bow the central part of the cutter bar to insure good cutting action at the center thereof. The reel is eccentrically mounted so that it may be adjusted relative to the cutter bar. An electric motor and gear reduction mechanism is provided to power both the reel and, if desired, the ground wheels which support the mower and associated carriage. Improved handle operated means for applying driving torque to the ground wheels at the selection of the operator is provided. Simple means for adjusting the height and adjusting the shearing action are provided.

Referring now to the drawings, there is illustrated a reel type power driven lawn mower generally indicated at 30 comprising a rigid frame embodying the present invention designated as 31, within which frame is rotatably journaled a reel 32 having a reel shaft 32a. The frame 31 effectively defines a sort of carriage supported by rubber tired ground wheels generally designated at 33 and 34. Suitably mounted on the carriage or frame is a prime mover generally designated at 35, which is a combined electric motor and reduction gear mechanism. For the purpose of guiding the carriage, there is included a handle assembly generally designated at 36, which handle assembly is pivotally associated with the carriage or frame 31 in a manner described in detail hereinafter.

Figures 1, 8, 9:
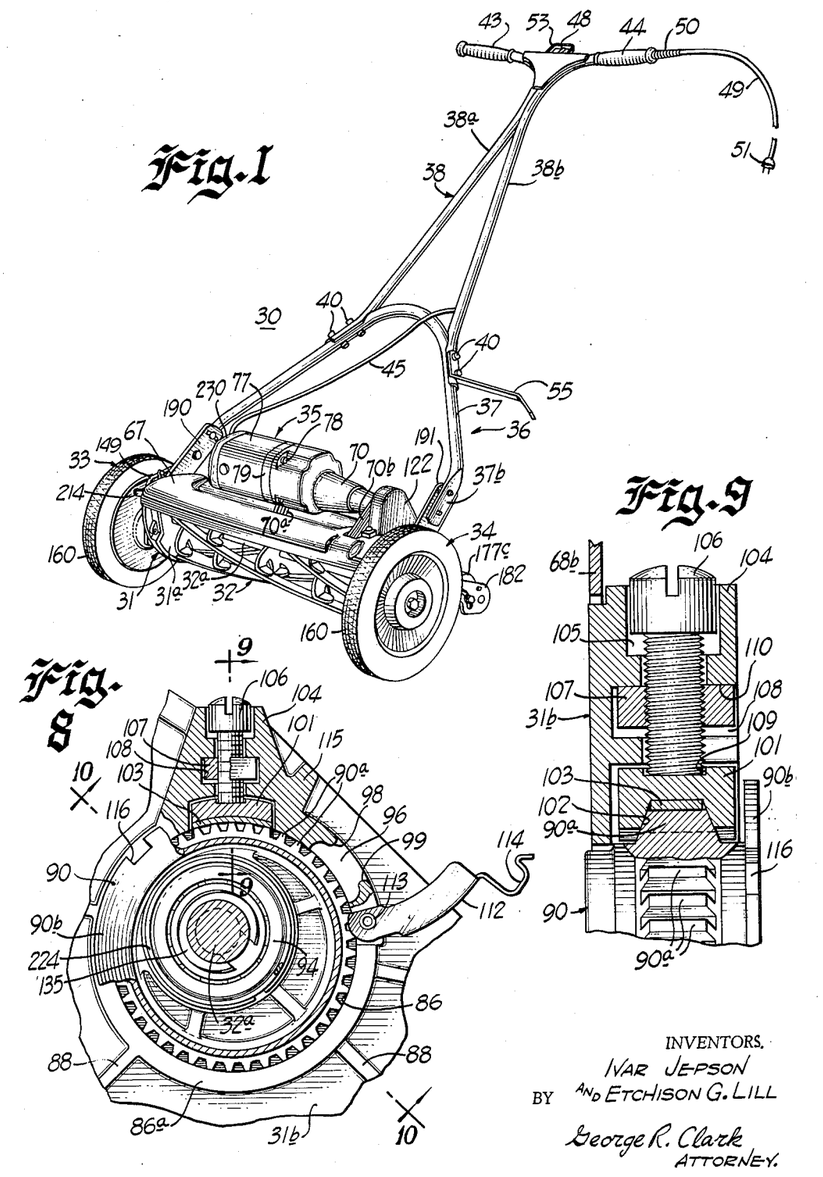
FIG. 1 is a perspective view of a power operated lawn mower built in accordance with the present invention.
FIG. 8 is a greatly enlarged fragmentary view, partly in section, of the reel adjusting portion of FIG. 3 with a cover portion shown in open position.
FIG. 9 is an enlarged sectional view taken on line 9—9 of FIG. 8, assuming that FIG. 8 shows the complete structure.

The handle assembly best shown in FIG. 1 of the drawings is illustrated as being very similar to that disclosed in Jepson Patent No. 2,926,478 referred to above. As illustrated, the handle assembly 36 comprises a lower tubular U-shaped member 37 having the bight portion thereof secured to an upper handle assembly 38 comprising tubular members 38a and 38b. The U-shaped member 37 defines a fork with the ends thereof flattened as indicated at 37a and 37b for connection with the mower frame 31 as described hereinafter. These tubular members 38a and 38b have the upper ends thereof welded or otherwise secured together and then this assembly is preferably bolted as by fastening means 40 to the bight portion of U-shaped member 37. The upper handle assembly 38 is designed so that each section 38a and 38b has a lateral projection to receive a handle bar grip portion 43 and 44 respectively by which the operator may manipulate the mower. Preferably a power cord 45 connected to the unit 35 including the electric motor extends through one of the tubular members such as 38b.

It is, of course, desirable that the operator may readily control the energization of the electric motor contained in the unit 35, and to this end a suitable switch 48 is mounted within the space defined by the divergence of the lateral projections of the tubular handle portions 38a and 38b. The power cord 45 preferably terminates in this space so as to permit ready connection to be made to the switch 48. Moreover, a power cord 49 enters this area through the upper end of the tubular handle member 38b and through an opening in the grip 44 associated with that member 38b. Suitable strain relief means, not shown, are provided for the cord 49, and to support the cord at a greater distance from the handle assembly and also to prevent or eliminate wear where it enters the grip 44 a coiled spring 50 is provided, arranged concentrically with the power cord and the end of the handle grip portion 44. The power cord 49 is very short and terminates in a conventional male type plug connector 51 for connection with a conventional extension cord. In this way the power cord may be disconnected closely adjacent the mower and a minimum of extension cord need be normally associated with the mower 30. A suitable guard 53 is provided around the handle or lever of the switch 48 to prevent inadvertent actuation thereof and to protect the same.

It will be understood that to mow a substantial area quite a length of extension cord may be required and a storage problem with respect to such cord is involved. It has been found desirable to store the cord on the mower, and to this end the handle assembly 36 is provided with a cord bracket 55, which is held in place by the same fastening means 40 which hold the upper and lower handle portions together. The cord can then be wrapped around one of the handle grip portions, such as 44, and the cord bracket 55.

An important feature of the present invention resides in the construction of the frame, which is of lightweight and yet very rigid construction and results in a lightweight and yet satsfactory power operated reel type lawn mower. Referring particularly to FIGS. 2, 3, 5, 6, 11, 13 and 21 of the drawings, the frame 31 is essentially a casting of aluminum or other lightweight metal, and is an integral unit. As illustrated, it comprises end plates 31a and 31b which are held in spaced paralled relationship by a pair of crossbars 31c and 31d, respectively. In order to reduce the weight, the crossbar 31c, in accordance with the present invention, is not a solid casting, but is actually a hollow cross rod of cast aluminum or the like surrounding an embedded steel tube 57. (See FIGS. 6, 11, 17 and 21.) The cross rod 31d on the other hand is merely a hollow steel tube having its ends embedded in the cast end plates 31a and 31b (see FIG. 12). The ends of tube 57 are likewise embedded in the end plates 31a and 31b thereby to provide an integral frame of lightweight and yet having great strength against twisting forces or the like.

Since crossbar 31d is essentially only a steel tube it will be designated either as steel tube 31d or crossbar 31d. Preferably the steel tubes 31d and 57 are each formed of cold rolled steel and are suitably anchored during the casting operation of the lightweight frame 31 in the end portions 31a and 31b by providing the exterior end portions with a roughened or knurled surface designated at 59, best shown in FIG. 21 of the drawings. Any other means for securely uniting the ends of the steel tubes with the cast end plates 31a and 31b could, of course, be employed. The use of these tubes in addition to providing rigidity and reducing the weight provides a means for insuring good cutting action at the center of the cutter bar to be described in detail hereinafter. Thus, without the use of any cores during the casting operation, hollow tubes are provided extending from one end of the frame to the other.

In accordance with the present invention a die casting operation is employed in making the frame 31 having the anchored steel tubes 31d and 57 either wholly or partially defining the crossbars 31d and 31c respectively. Since the frame except for the steel tubes 31d and 57 is made of aluminum there is the problem of differential expansion during the manufacturing process. Preferably the molten aluminum during the die casting operation has an initial temperature of about 1300° F. The aluminum heats the ends of tubes 31d and 57 to about 1000° F. before the composite structure begins to cool. Actually, the portion of the tube 57 between the ends thereof which is embedded in a relatively thin aluminum tube defining crossbar 31c is heated to a less extent during the die casting operation than the end portions of the steel tubes which are embedded in a relatively large mass of aluminum. Consequently, as the frame cools after the die casting operation, the aluminum portion of the crossbar 31c will tend to shrink much more than the steel tube 57. To prevent such differential shrinkage, the steel tube 57 and likewise the steel tube 31d are heated to a temperature of about 1000° F. at the time they are inserted into the die casting apparatus, and the die casting operation is begun immediately thereafter.

Figures 5, 17, 21:
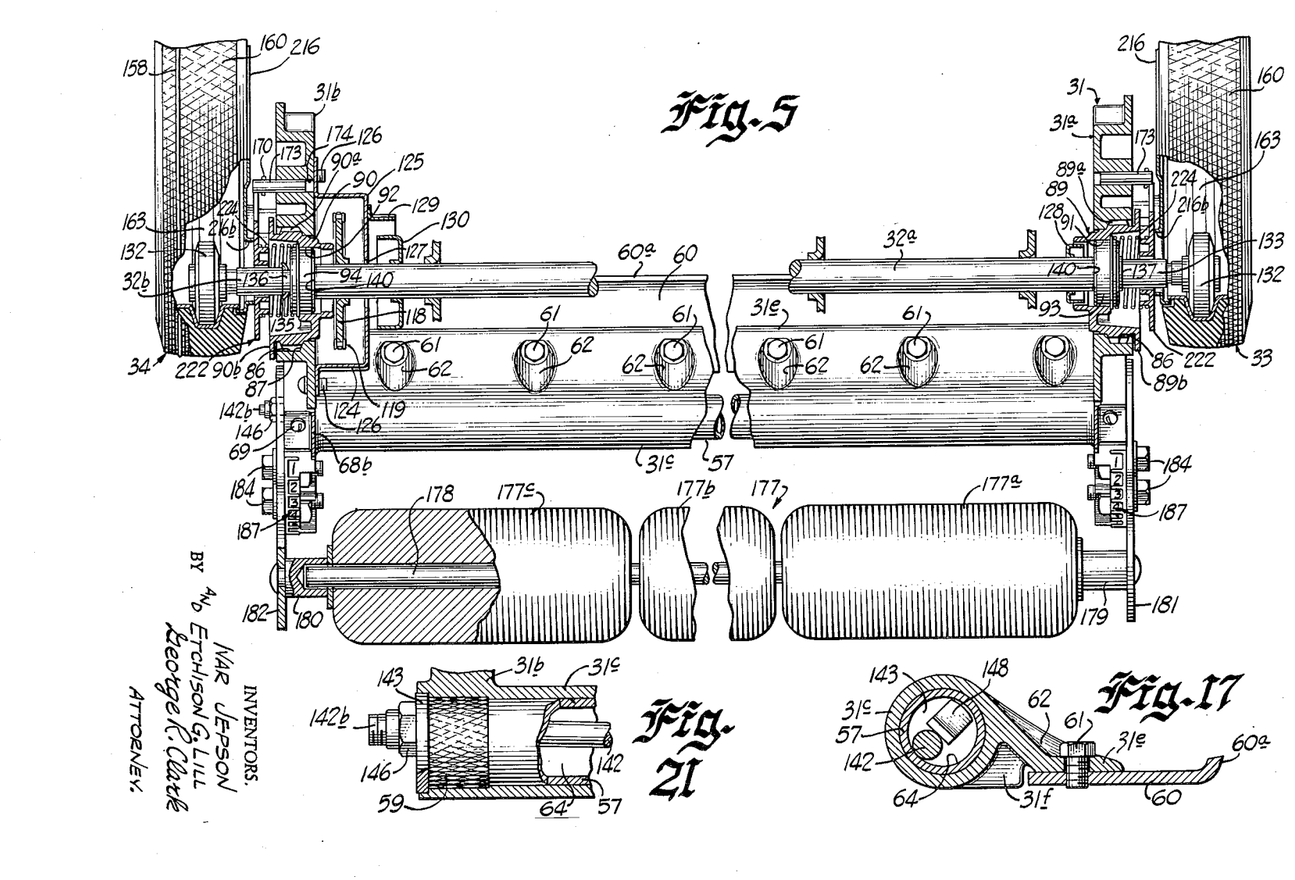
FIG. 5 is a sectional view with certain portions cut away taken on line 5—5 of FIG. 4, assuming that FIG. 4 shows the complete structure.
FIG. 17 is an enlarged fragmentary sectional view taken on line 17—17 of FIG. 2.
FIG. 21 is a greatly enlarged sectional view with certain portions cut away taken on line 21—21 of FIG. 6.
Figure 6:
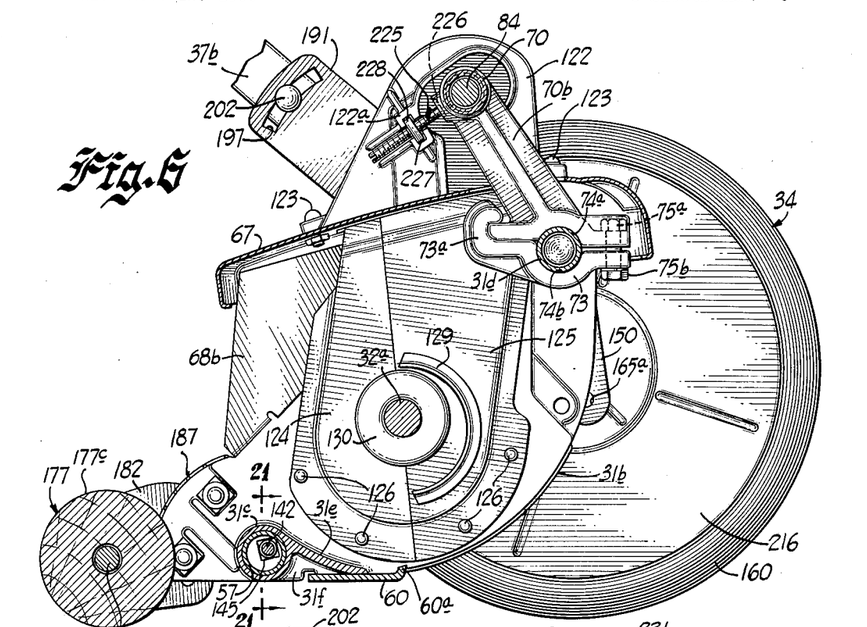
FIG. 6 is a sectional view taken on line 6—6 of FIG. 2, also assuming that FIG. 2 shows the complete structure.
Figure 11:
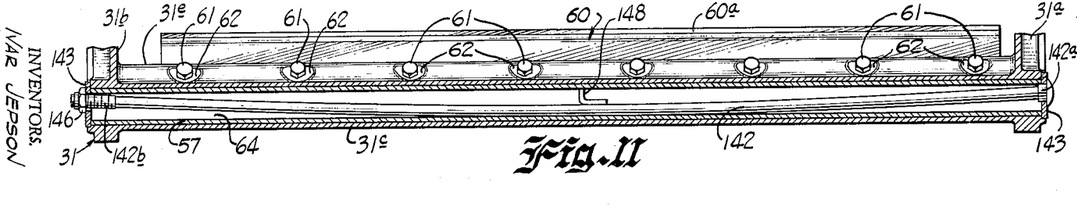
FIG. 11 is a sectional view taken on line 11—11 of FIG. 3 assuming that FIG. 3 shows the complete structure.
Figure 12:
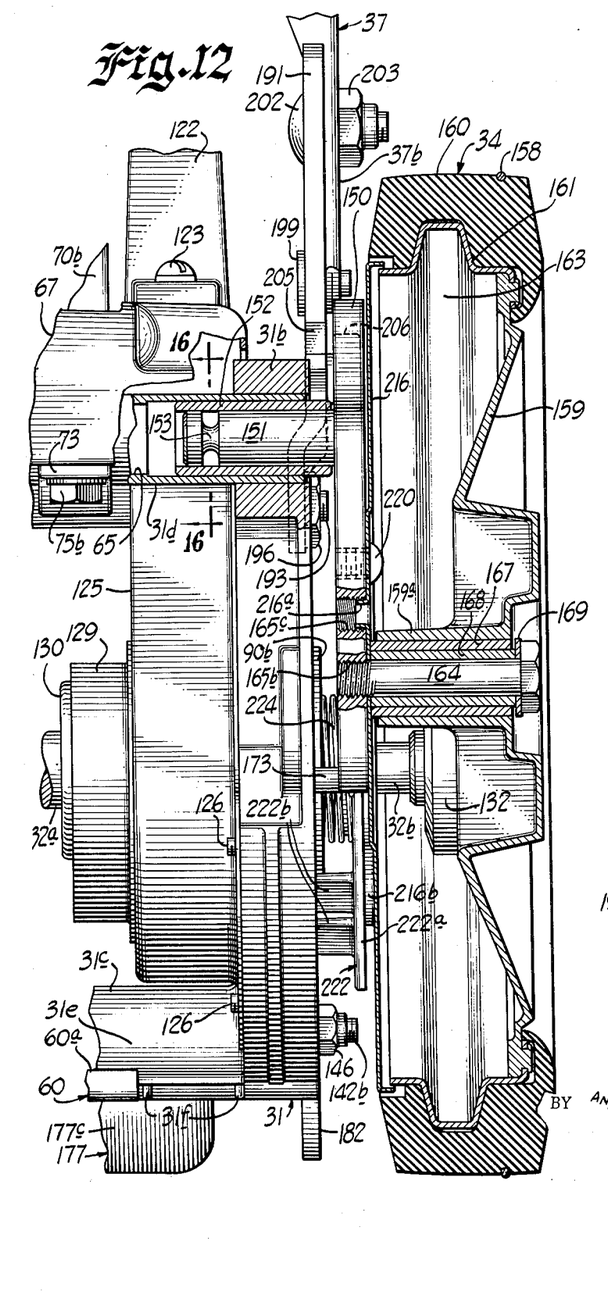
FIG. 12 is a greatly enlarged fragmentary front elevational view of one end of the lawn mower of FIG. 1 with certain portions broken away or shown in section.

Before considering the details of the die casting operation attention is directed to the fact that the crossbar 31c in accordance with the present invention essentially defines a cutter bar support. Thus, as best shown in FIGS. 6, 11, and 17 the crossbar 31c includes a rearwardly directed web portion 31e including a plurality of spaced parrallel depending reinforcing webs or ribs 31f (FIGS. 6, 12 and 17). The ribs 31f have the forward portions thereof cut away slightly to define a plurality of spaced supports having the lower edges disposed in a common plane so as to define a rigid support for a cutter bar 60 which is suitably clamped against the bottom of the ribs or webs as by suitable screws 61 the heads of which are disposed in pockets 62 spaced along the length of the web 31e as best shown in FIGS. 2, 5, 11 and 17 of the drawings. The cutter bar 60 is, of course, formed of good cutting steel and is provided at the end thereof remote from the crossbar 31c with an upturned portion 60a which defines the cutting surface for providing shearing action with the reel 32 in a manner well understood by those skilled in the art. The cutter bar 60 is preferably provided with tapped openings for receiving the screws 61 for clamping the same against the edges of the ribs 31f in a manner best shown in FIGS. 6 and 17 of the drawings.

The end plates 31a and 31b of the frame must be parallel with one another in the completed frame. To this end it is important during the casting operation to make sure that any differential expansion between the steel tube 57 and the adjacent aluminum portions of the crossbar 31c and the associated portions 31e and 31f do not interfere with this parallel relationship. In order to insure that during the casting operation the tube 57 contracts or shrinks the same amount as the aluminum portion of the crossbar 31c and the associated cutter bar supports and to eliminate differential movement of the cutter bar support 31e and the associated integral aluminum portion of crossbar 31c relative to the steel tube 57, a steel die is used in the die casting operation and this die is provided with core portions complementary to the pockets or recesses 62 as well as core portions which fit between and define the spaced ribs 31f. These ribs 31f are essentially reinforcing ribs or webs spaced uniformly along the crossbar 31c and they serve as keys relative to the core portions of the die spaced therebetween. Since the die is made of steel like the steel insert 57 it does not shrink as much as the aluminum which defines the crossbar 31c and the associated cutter bar support during cooling of the cast aluminum, and the webs or ribs 31f between the core portions of the die as well as the core portions of the die fitting into the pockets 62 act to key the aluminum crossbar 31c and its integral cutter bar extension to the die. This has the effect of stretching the aluminum defining the crossbar 31c uniformly along its length as it solidifies and cools during the casting operation thus keeping the aluminum portion of the crossbar from shrinking more than the steel tube 57. It will be apparent that by preheating the steel tube 57 and 31d and also by the keying operation of the die relative to the casting that the end plates 31a and 31b are maintained parallel to each other.

In order that the frame 31 and particularly end plates 31a and 31b may suitably support the cutting mechanism the die for the die casting operation is provided with suitable end cores to define certain openings and the like in frame 31 for supporting the reel and other portions of the mechanism. Also for purposes which will become apparent from the ensuing description the ends of the hollow crossbars 31c and 31d are open and accessible from the outer ends of end plates 31a and 31b of the frame 31. Thus, as best illustrated in FIGS. 11, 17 and 21 of the drawings the crossbar 31c provides an elongated passageway 64 from end to end thereof which is accessible from the ends of the frame. Similarly the crossbar 31d as best shown in FIGS. 12 and 13 of the drawings defines the passageway 65 therein which is also accessible from either end of the frame 31.

For the purpose of enclosing the upper part of the cutting mechanism, the frame 31 preferably supports a platform 67 which is preferably formed of sheet metal and provides a sort of deck construction or top guard over the reel 32. As illustrated in the drawings, the deck is provided with a depending peripheral flange and at either side of the mower suitable deck supporting plates 68a and 68b are provided which are preferably welded or otherwise secured to the deck or platform 67. These plates 68a and 68b, which except that one is a right hand plate and the other is a left hand plate are identical, are bolted as by fastening means 69 to the frame 31.

Figure 2:
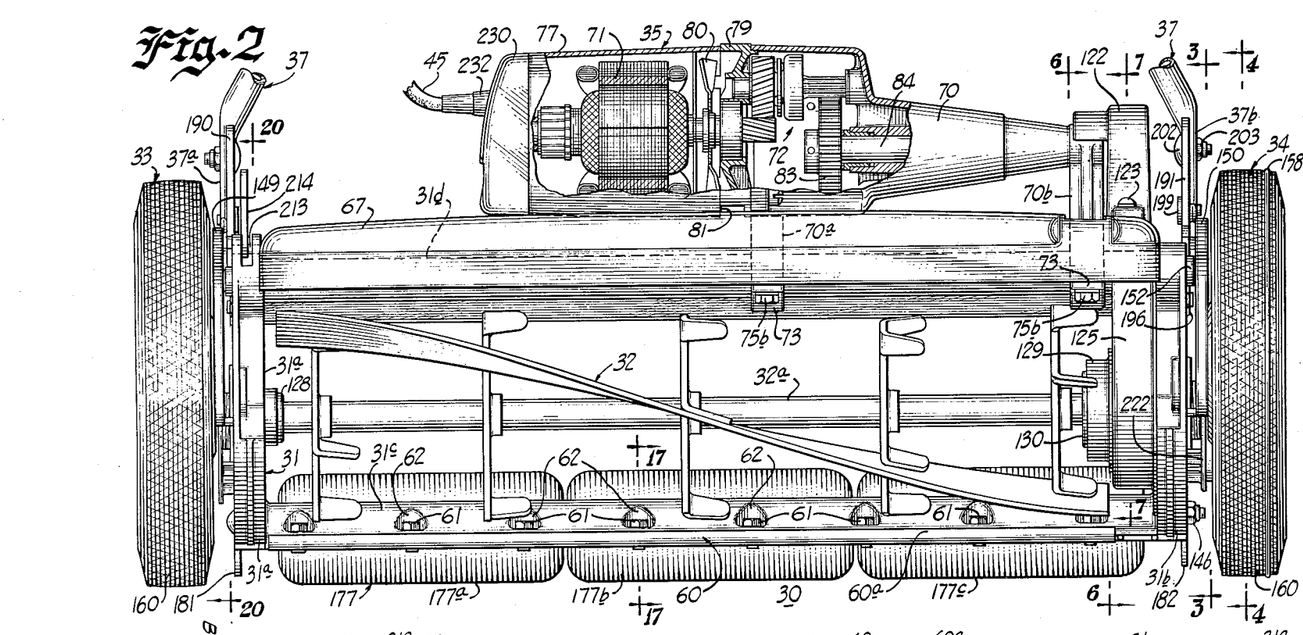
FIG. 2 is an enlarged front elevational view of the lawn mower of FIG. 1 with the handle portion removed and with certain portions cut away or shown in section to illustrate details of the present invention.

Mounted above the platform or deck 67 is the power unit 35 which is suitably supported from the frame 31. The power or electric motor unit 35 is preferably identical with that disclosed in the copending Lill application, Serial No. 772,881, filed November 10, 1958, and assigned to the same assignee as the present application. As best shown in FIG. 2 of the drawings, the power unit 35 is essentially a combined electric motor, reduction gear, and overload clutch mechanism fully disclosed and claimed in the concurrently filed copending application referred to above. As illustrated in FIG. 2, there is provided an electric motor 71 and a combined reduction gear mechanism and overload clutch mechanism 72 mounted within a suitable housing. As illustrated, this housing comprises several sections and includes a gear housing 70 preferably formed as a generally cylindrical casting including an elongated tapered portion and also including integrally formed arms or brackets 70a and 70b which are suitably clamped to the crossbar 31d of the frame 31 as described hereinafter, as by suitable clamps 73. The gear housing 70 thus forms a support for the entire power unit 35. As best shown in FIG. 6 of the drawings, the arms such as 70a and 70b each terminate in a downwardly directed recess 74a which, with upwardly directed recesses 74b in each of clamps 73, receive the crossbar 31d in clamping relationship therebetween. The clamps 73 each have a hook portion 73a at one end to engage a cooperating extension on the associated brackets 70a or 70b, and clamping bolts 75a and nuts 75b provide the necessary clamping force to support the prime mover 35 from frame 31.

To complete the housing for the unit 35, there is provided a motor housing section 77 of cup-shaped configuration within which is mounted the electric motor 71. The open end of the motor housing 77 is suitably secured as by bolts 78 (FIGS. 1, 3 and 4) to the open end of the gear housing 70 with an interposed gear housing closure plate and bearing support member 79 clamped therebetween. Electric motor 71 is drivingly connected to a suitable fan 80 for circulating cooling air through the end of the motor housing 77 remote from the gear housing 70 and out through an exhaust opening 81 (FIG. 2) defined at the bottom of the plate 79. The combined overload clutch and reduction and gear mechanism 72 forms no part of the present invention, but provides an arrangement for driving the reel 32 at the proper speed and also a safety device whereby, if the reel 32 should be stopped as by wedging a foreign object between the blades of the reel 32 and the cutter bar 60, the power transmission between the electric motor 71 and the reel 32 will be interrupted. As far as the present invention is concerned, the reduction gear mechanism and combined overload clutch unit 72 includes an output gear 83 which is mounted on an output drive shaft 84 suitably journaled within the tapered portion of the gear housing 70. The end of the output shaft 84 extending outside the housing 70 is disposed adjacent the end plate 31b of the frame 31 and has secured thereto a suitable sprocket 85 (FIG. 7) for transmitting power to the cutting reel 32 and when desired to the ground wheels 33 and 34.

For the purpose of rotatably supporting the reel 32 and specifically the reel shaft 32a in frame 31 the end plates 31a and 31b are each provided with enlarged aligned openings or sockets designated as 86 (see FIGS. 5, 10 and 13 of the drawings) defined by an annular flange 86a formed integrally with the frame 31. The cast metal defining the end plates 31a and 31b is so arranged within these openings or sockets 86 as to define an annular shoulder generally at right angles to the annular flange 86a and having a somewhat angularly disposed wall defining shoulder 87. The sockets 86 are adapted to receive reel bearing supports 89 and 90 (FIGS. 5, 8, 9 and 10) for supporting the reel bearings described hereinafter. To increase the rigidity of the end plates 31a and 31b and to provide maximum support for the sockets 86, the casting defining the frame 31 preferably includes reinforcing struts 88 best shown in FIGS. 3 and 13 of the drawings which have the same depth as flange 86a and radiate therefrom. The shoulder 87 effectively defines a frusto conical seat best shown in FIG. 10 of the drawings for the reel bearing supports 89 and 90.

Figure 10:
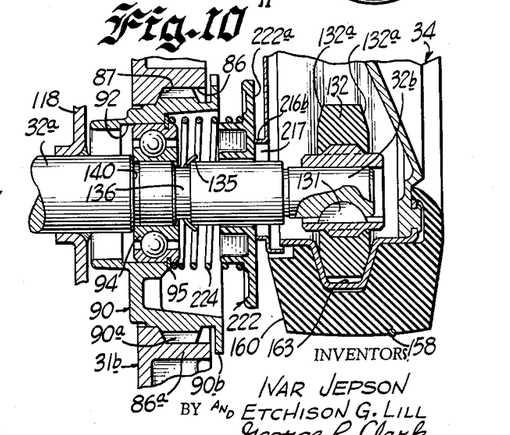
FIG. 10 is a fragmentary sectional view taken on line 10—10 of FIG. 8, also assuming that FIG. 8 shows the complete structure.

The cutter bar 60 as described above is rigidly secured to the frame 31 and hence relative adjustment between the reel 32 and the cutter bar 60 can only be accomplished by adjustment of the reel position. To this end the reel bearing supports 89 and 90 as best shown in FIGS. 5 and 10 of the drawings are provided with eccentric openings 91 and 92 therein respectively. These openings 91 and 92 are so arranged as to respectively receive therein combined radial and thrust bearings 93 and 94, which bearings are preferably press fitted into the eccentric openings 91 and 92. A suitable C-washer 95 (FIG. 10) insertable into a groove defined in the bearings such as 93 and 94 limits the extent to which the bearings are pressed into the eccentric openings 91 and 92 respectively. In view of the eccentric openings 91 and 92, it will be understood that rotation of the reel bearing supports 89 and 90 within the sockets 86 will cause relative movement of the reel shaft 32a supported thereby toward or away from the cutter bar 60.

In order to adjust the positions of the reel bearing supports 89 and 90 in the sockets 86 thereby to adjust the reel 32 relative to the cutter bar 60 the flange 86a is discontinuous for a short section, effectively to define an access opening 96 best shown in FIGS. 8 and 13 of the drawings which opening is defined by shoulders 98 and 99 at the ends of flange 86a determining the discontinuous portion thereof. This opening permits the ready entry of a suitable prying tool such as a screwdriver or the like. So that such a prying tool may move reel bearing supports 89 and 90, the peripheries of the major portion of the reel bearing supports 89 and 90 are provided with gear teeth 89a and 90a respectively. A prying tool inserted through the openings 96 can then readily engage the teeth such as 89a or 90a. By using the shoulders 98 or 99 as fulcrums for the prying tool, rotation of the reel bearing supports 89 and 90 with the resultant movement of the reel shaft 32a toward or away from the cutter bar 60 can readily be accomplished. In adjusting the relative position of the reel and cutter bar the relatively equal adjustment of the two reel bearing supports 89 and 90 will of course be accomplished to insure proper cutting action. So one may readily see that these reel bearing supports 89 and 90 are in about the same relative positions they are preferably each provided with an annular flange 89b and 90b respectively which flange overlies the annular flange 86a defining the socket 86. The flanges 89b and 90b preferably each include a notch 116 (FIGS. 3, 8 and 10) thus permitting the operator to see readily that the notches 116 in the reel bearing supports 89 and 90 are roughly in the same relative positions.

Once adjustment of the reel 32 relative to the cutter bar 60 has been accomplished it is desirable to lock the adjustment so that it cannot be inadvertently changed. To this end there is provided a reel bearing support lock plate 101 best shown in FIGS. 8 and 9 of the drawings which is provided with a channel 102 having tapered side walls for receiving the gear teeth 89a or 90a as the case may be therein. To provide good clamping action a flat leaf spring 103 is preferably disposed within the recess 102 so that it may be tightly clamped against the gear teeth such as 89a or 90a thus firmly securing the reel bearing supports 89 and 90 in fixed adjusted position within the sockets 86. To apply clamping force to the lock plates 101 the frame at each of the end plates 31a and 31b is provided with a boss portion 104 having an opening 105 for receiving a clamping screw 106. The clamping screw preferably engages a square nut 107 disposed in a square recess 108. The end of clamping screw 106 preferably is received within a shallow recess 109 in the lock plate 101. It will be apparent that upon adjusting the screw 106 the nut 107 will be forced against a shoulder 110 defining the upper boundary of the recess 108 and the clamping force will be transmitted to the lock plate 101 and through the leaf spring 103. To provide good clamping action the lock plate 101 is of arcuate configuration so as to conform to the periphery of the gear teeth such as 89a or 90a. Thus, as the lock plate 101 is forced down against these teeth which also have tapered side walls, they are wedged tightly between the correspondingly tapered side walls defining the recess 102. The function of the leaf spring 103 is to take up any backlash and keep the reel bearing supports 89 and 90 seated against the lower portion of the sockets 86. Thus, as the clamping screw 106 is released the spring 103 which is a straight, flat piece of leaf spring tends to straighten out and keeps a limited amount of pressure on the reel bearing supports 89 and 90.

In order to keep dirt from entering the opening 96 a suitable cover 112 is provided which cover is pivoted as indicated at 113 to the associated end plates 31a and 31b. The cover 112 is provided with a spring latching clip 114 which is engageable with a suitable lug 115 formed as an integral part of the end plate such as 31a and 31b. The cover 112 is shown in the open position in FIG. 8 of the drawings and in the closed position in FIG. 3 of the drawings. When adjustment of the reel 32 relative to the cutter bar 60 is desired the covers 112 are opened to permit access with a suitable prying tool as fully described above.

Figure 7:
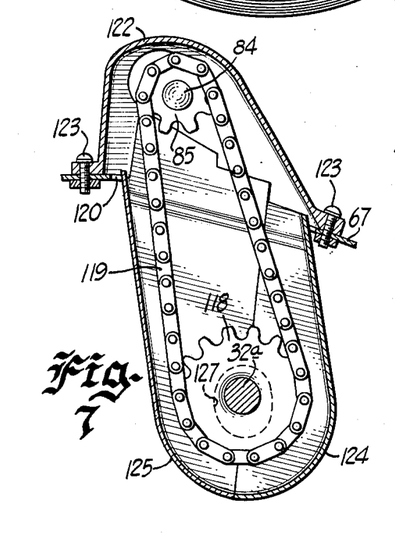
FIG. 7 is a fragmentary sectional view taken on line 7—7 of FIG. 2, also assuming that FIG. 2 shows the complete structure.

For the purpose of driving the reel 32 from the output shaft 84 and consequently the sprocket 85 of the power unit 35 there is secured to the reel shaft 32a a suitable sprocket 118 (FIGS. 5 and 7 of the drawings). A suitable chain 119 then interconnects the sprockets 85 and 118 in a manner well understood by those skilled in the art. Since the sprocket 85 is mounted above the platform or deck 67 and the sprocket 118 is mounted below this platform 67 a suitable opening 120 is defined in the platform for the chain 119. So that the operator is protected from coming in contact with the sprocket 85 and the chain 119 above the opening 120 there is provided a suitable top chain guard 122 which as is best shown in FIGS. 2 and 7 is secured to the platform or deck 67 by fastening means 123. This top chain guard 122 may be a casting or a sheet of metal stamping as the case may be. In order to enclose the chain 119 and the sprocket 118 below the platform 67 there are provided a pair of cooperating chain guards and grass shields 124 and 125 (FIGS. 6 and 7) suitably secured to the inside of end plate 31b of frame 31 as by fastening means 126 (FIGS. 3, 4, 5 and 12 of the drawings). In order that the reel 32 may be adjusted relative to the cutter bar 60 the guards 124 and 125 are provided with means defining an elongated opening 127 (FIG. 7). Preferably a suitable arcuate grass guard 129 is secured to the front chain guard section 125 and partially surrounds the reel shaft 32a as best shown in FIGS. 5, 6 and 12 of the drawings. To further prevent the entrance of grass into the opening 127 there is provided a grass shield 130 which is an annular cup-shaped member secured to the shaft 32a as clearly shown in FIGS. 5, 6 and 12 of the drawings. A similar but somewhat smaller grass shield 128 is provided at the other end of the reel shaft 32a as clearly shown in FIG. 5 of the drawings which is secured to the shaft and is concentrically disposed with respect to the reel bearing support 89.

Figure 4:
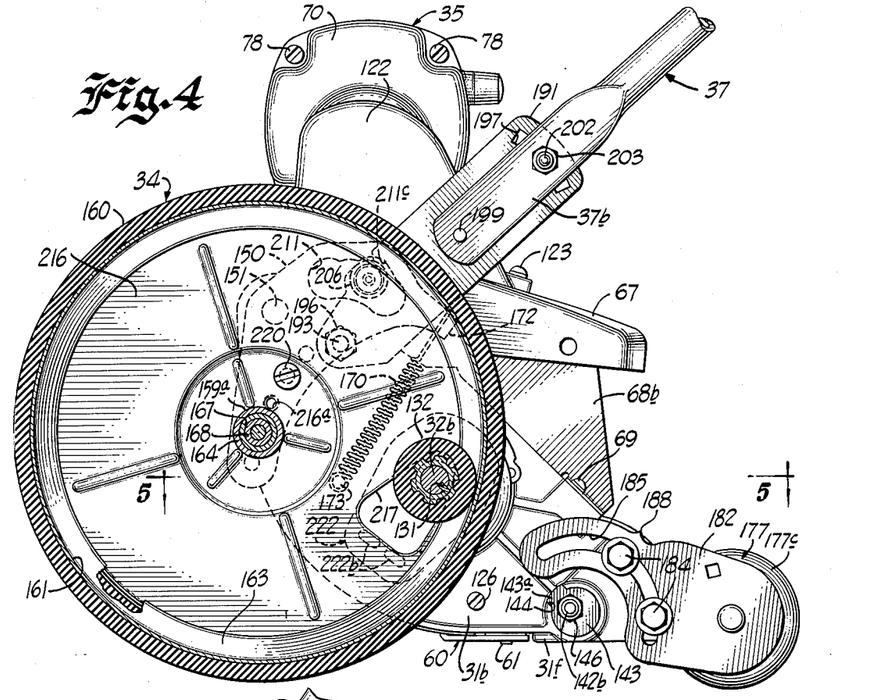
FIG. 4 is a sectional view taken on line 4—4 of FIG. 2, again assuming that FIG. 2 shows the complete structure and with the controls in the same position as FIG. 3.

From the above description it will be apparent that upon energization of the electric motor 71 a driving torque is supplied to the reel 32a, and by virtue of the reduction gear mechanism the desired speed of rotation is obtained. Moreover, this reel may be adjusted relative to the cutter bar 60 to insure proper cutting action. In order that the ground wheels 33 and 34 may also be driven from the electric motor 71, the shaft 32a is provided at one end with an integral extension 32b which extends beyond the end plate 31b and has suitably secured thereto as by a key 131 (FIGS. 4 and 10) a friction drive roller 132. Except for an assembly problem, the other end of reel shaft 32 might be provided with a similar extension such as 32b. However, in order to permit ready assembly of the lawn mower parts there preferably is provided a separate stub shaft 133 (FIG. 5) which is threadedly secured to the end of the reel shaft 32a adjacent the end plate 31a of the frame 31. Secured to this stub shaft 133 is a drive roller 132 identical in every respect to the drive roller associated with the shaft end 32b. The details of construction of these drive rollers is best shown in FIGS. 4 and 10 of the drawings. In assembling the reel 32 to the frame 31 the shaft 32a has the end 32b thereof first assembled with the end plate 31b and associated reel bearing support 90. A suitable distorted spring C-washer 135 is then applied to a groove 136 in the shaft 32a. This resilient C-washer then becomes an end thrust washer bearing against the bearing 94 to prevent movement to the right as viewed in FIG. 5 of the drawings. An end thrust washer 137 is then forced against the bearing 93 when the stub shaft 133 is secured to the end of the shaft 32a thus preventing movement to the left of the reel shaft 32a as viewed in FIG. 5 of the drawings. Additionally the shaft 32a is provided with shoulders such as 140 shown in FIG. 10 of the drawings, which provide a thrust bearing for bearing against the other sides of the bearings 93 and 94.

As was pointed out above the center portion of the cutter bar 60 is bound to receive more wear than the end portions. To insure proper shearing action of the reel 32 along the entire length of the cutter bar 60 means are provided in accordance with the present invention to bow the center portions of the cutter bar toward the reel 32 if necessary. To this end there is provided as best shown in FIGS. 11, 13 and 21 a tension bolt 142 extending within the passageway 64 defined within the hollow crossbar 31c. Suitable tension bolt washers 143 are provided for either end of the tension bolt 142. These washers are circular but are provided with an integral projection 143a receivable in a cooperating notch 144 (FIG. 13) defined in the end plates 31a and 31b immediately adjacent the opening leading into the passageway 64. Each of the washers is provided with a square opening 145 which opening is eccentrically positioned relative to the washer 143. The tension bolt 142 has a square shoulder 142a to engage the square opening 145 in the associated washer 143. The other end of the tension bolt 142 is threaded as indicated at 142b to receive a clamping nut 146. To perform the bowing action there is secured to the center portion of the tension bolt 142 an angle member 148 (FIGS. 11 and 17) which may be made from flat wire or the like and which is suitably welded or otherwise secured to the tension bolt 142. Since the openings 145 are disposed adjacent the top of the passageway 64 as viewed in FIG. 11 of the drawings, by virtue of the particular orientation of the washer 143 occasioned by the lugs 143a and notches 144, when tension is applied to the tension bolt 142 by virtue of the nut 146 there will be produced an upwardly directed force applied to the center of the crossbar 31c by the angle member 148. Consequently the crossbar 31c, the cutter bar support 31e and cutter bar 60 may be bowed toward the reel at the center thereof to insure proper shearing action under all conditions.

Figures 15, 16, 17:
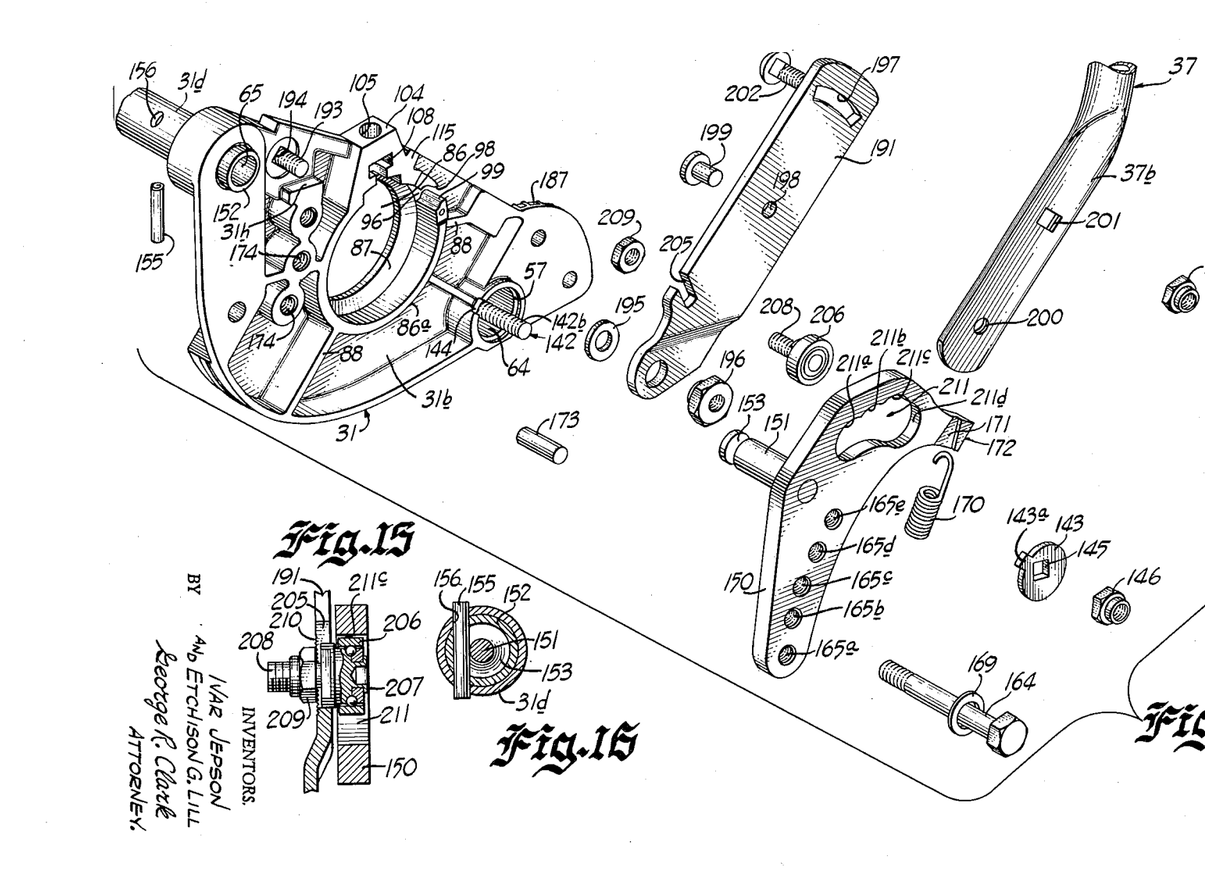

In order to support the frame 31 and consequently the lawn mower from the ground wheels 33 and 34 there are provided a pair of wheel mounting plates 149 and 150 associated with the frame end plates 31a and 31b respectively. Each of these wheel mounting plates 149 and 150 is pivotally mounted to the frame 31. To this end these plates are each provided with a pivot shaft 151 suitably secured thereto which pivot shafts are adapted to extend into the ends of the passageway 65 defined in the crossbar 31d. As best shown in FIGS. 12, 13 and 16 of the drawings a suitable bearing sleeve 152 preferably formed of a lubricant impregnated material is driven into each end of the passageway 65 in crossbar 31d and the pivot shafts 151 are inserted therein. In order to hold the wheel mounting plates 149 and 150 in assembled relationship with the frame the pivot shafts are preferably provided with an annular recess 153 for receiving a suitable key or pin 155, inserted through aligned openings 156 in the crossbar 31d and the sleeve 152 as best shown in FIGS. 13 and 16 of the drawings. In this way the wheel mounting plates 149 and 150 are pivotally secured to the frame 31. As will become apparent from the ensuing description, this pivotal movement of the wheel mounting plates 149 and 150 is utilized in moving the wheels into and out of driving engagement with the drive rollers 132.

The wheels 33 and 34 are essentially identical except that the wheel 34 is provided with a peripherally disposed grounding conductor 158 (FIGS. 2 and 12) which is suitably electrically connected to the metal wheel portions preferably in exactly the same manner as the arrangement disclosed in copending Jepson application No. 574,489, now patent No. 2,926,478, referred to above. This insures that the motor frame is suitably grounded at all times. Since the wheels except for the presence or absence of grounding conductor 158 are identical, the wheel 34 only will be described in detail. As illustrated in FIG. 12 of the drawings the wheel 34 comprises a metal disk 159 essentially defining a disk wheel with an integral central bearing support 159a in the form of an elongated sleeve. Suitably secured to the periphery of the disk wheel portion 159 is a driving rim 161 which also supports the rubber tire 160. It is this rubber tire which insulates the wheels from ground which necessitates the grounding conductor 158 referred to above. The driving rim 161 is disposed in concentric relationship with the sleeve 159a and is provided with an annular driving recess or channel 163 which preferably has a driving surface complementary to the shape of the drive rollers 132. As best shown in FIGS. 10 and 12 of the drawings the driving channel 163 for the wheel 34 has side walls flaring outwardly towards the mouth of the channel to define a cross section in the form of a truncated pyramid. Correspondingly the drive rollers 132 which are formed of a suitable friction material such as a fiber or the like are provided with tapered side walls 132a to make friction driving engagement with the walls of the driving channel 163 of the wheel 34. With this arrangement it will be apparent that as the wheels and specifically the drive channels 163 thereof are forced into engagement with the drive rollers 132 the greater force biasing the rollers into the channels the more firm the driving engagement by virtue of the flaring walls of the recess 163 and the tapered walls 132a of the friction drive rollers 132. As best shown in FIG. 12 of the drawings, the wheels 33 and 34 are suitably mounted on wheel axles 164 threadedly engaging suitable ones of a plurality of openings designated as 165 in the wheel mounting plates 149 or 150 as the case may be. A suitable sleeve bearing defined by concentric sleeves 167 and 168 is provided for the wheels 33 and 34.

It is common practice to provide means for adjusting height of the cut in lawn mowers and to this end instead of a single opening 165 in the wheel mounting plates 149 and 150 a plurality of openings spaced in a predetermined manner are provided as best shown in FIG. 13 of the drawings. As illustrated five tapped openings 165 are provided designated as 165a, 165b, 165c, 165d and 165e, but only three of these namely 165a, 165b and 165c are used for height of cut adjustment. When the wheel axle 164 threadedly engages the openings 165a the maximum height of cut is obtained. A lower cut is obtained when axle 164 is in opening 165b as is the case in FIGS. 3 and 12 of the drawings, and a still lower cut is obtained when axle 164 is threaded in opening 165c. By virtue of the elongated sleeve 159a and the driving rim 161 disposed in concentric relationship, the disk portion 159 may be sufficiently removed from the associated wheel mounting plate such as 149 or 150 so that the friction drive roller 132 may readily engage with the driving recess 163 as clearly shown in FIG. 12 of the drawings.

For the purpose of biasing the friction drive rollers 132 into driving engagement with the wheels 33 and 34 and specifically with the driving recesses 163 there is provided for each wheel mounting plate 149 and 150 a tension spring 170 having one end thereof engaging a recess 171 provided in an extension 172 of the wheel mounting plates 149 and 150. The other end of the tension spring 170 is connected to a pin 173 secured to the frame 31 as by being fastened to a suitable opening such as 174 defined in the end plates 31a and 31b. These tension springs tend to bias the wheel mounting plates in a direction to cause the wheels to move into driving engagement with the drive rollers 132. For example, as viewed in FIG. 3 of the drawings the springs 170 bias the wheel mounting plates 149 and 150 in a clockwise direction about the pivot shafts 151 which means that the wheels 33 and 34 move to the left as viewed in FIG. 4 and consequently into driving engagement with the roller 132 as illustrated.

Figure 3:
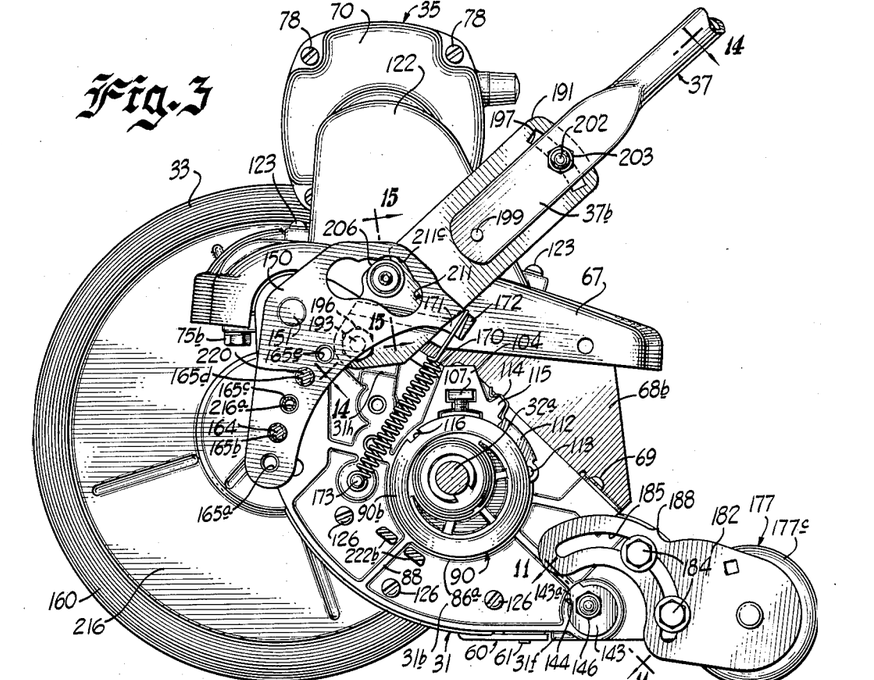
FIG. 3 is a sectional view taken on line 3—3 of FIG. 2 with certain portions cut away and with the controls in the drive position, assuming that FIG. 2 shows the complete structure.

From an examination of FIGS. 3 and 4 of the drawings it will be noted that the wheels 33 and 34 tend to support the front part of the frame 31. In order to support the rear of the frame 31 there is provided a ground roller 177 which may actually comprise a plurality of sections as indicated in FIG. 2 of the drawings designated as 177a, 177b and 177c. These rollers are suitably supported on a roller shaft 178 having its ends journaled in suitable bearings 179 and 180 riveted or otherwise secured to roller brackets 181 and 182 respectively. Preferably the brackets 181 and 182 are secured to the frame 31 and particularly to the end plates 31a and 31b thereof respectively by suitable bolts 184. As illustrated these bolts extend through an elongated arcuate opening 185 (FIGS.

3 and 4) in each of the brackets 181 and 182. This elongated opening permits different relative positions of the brackets 181 and 182 relative to the frame 31 and consequently also enters into the picture with respect to adjusting the height of the cut of the mower 30. As illustrated the frame 31 is provided on each of the end plates 31a and 31b with suitable indicia designated as 187 which indicia cooperates with an index or pointer 188 defined on each of the brackets 181 and 182. This indicia has a plurality of consecutive numbers from one up to five or six indicating a plurality of adjustments. Thus by utilizing the openings 165a, 165b and 165c in wheel mounting plates 149 and 150 and the various settings of brackets 181 and 182 there are provided ready means of adjusting the cut not only by the position of the brackets 181 and 182 but also the position of the axles 164 of the ground wheels 33 and 34.

Figure 14:
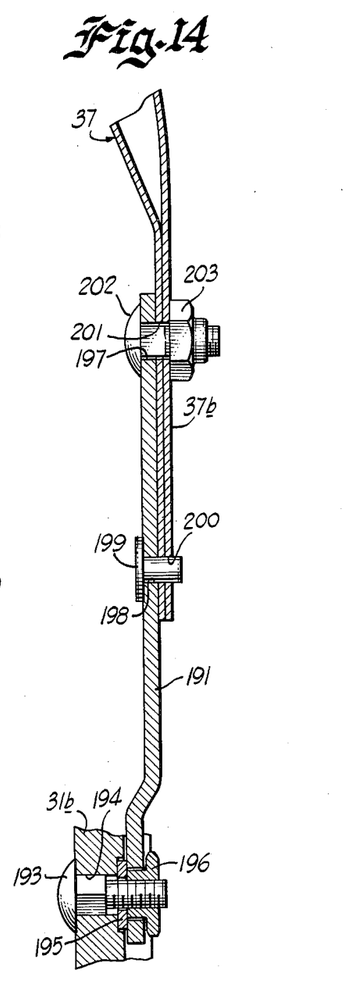
FIG. 14 is an enlarged sectional view taken on line 14—14 of FIG. 3.

For the purpose of securing the handle assembly 36 to the motor frame 31 there are provided a pair of handle mounting plates 190 and 191 pivotally secured to the end plates 31a and 31b respectively. As best shown in FIG. 14 of the drawings suitable handle mounting plate pivot bolts 193 extend through suitable openings 194 one provided in each of the end plates 31a and 31b. Preferably the end plates 31a and 31b are provided with a recess concentric with the opening 194 to receive a bearing washer 195 against which the handle mounting plate bears. A suitable shouldered nut 196 secures the handle mounting plates to the bolts 193 in a manner to permit free pivotal movement thereof about the axis of the bolts 193.

In order to secure the handle assembly 36 and more particularly the portion 37 to the handle mounting plates 190 and 191 each of the plates 190 and 191 is provided with an elongated arcuate opening 197 and a second opening 198 (FIG. 13). A suitable pin 199 extending through the opening 198 is preferably welded to the associated mounting plate such as 190 and 191 and is adapted to engage a cooperating opening 200 defined in the associated flattened portion 37a or 37b of the U-shaped handle member 37. The handle member 37 is also provided with openings 201 to receive a suitable bolt 202 and an associated nut 203 whereby the handle 36 may be secured to the plates 190 and 191 and hence to the mower 30. It will be understood that the arcuate slots 197 provided in the handle mounting plates 190 and 191 permit adjustment of the position of the handle assembly 36 relative to the handle mounting plates 190 and 191 so that the handle may be adjusted for a tall or a short operator as the case may be.

Some means must be provided to control the driving condition of the lawn mower 30. In other words it must be possible to have the driving rollers 132 in a no drive condition and selectively control the same so that they may be moved to a drive condition in driving engagement with drive channels 163 to propel the mower over the area to be mowed. In accordance with the present invention the control of the mower from the drive to no drive position is accomplished by limited pivotal movement of the handle assembly 36 and to this end each of the handle mounting plates 190 and 191 is provided with a recess or notch 205 for securing thereto a suitable cam roller 206. As best shown in FIGS. 13 and 15 of the drawings, the cam roller 206 is mounted on suitable ball bearings 207 and supported on a bolt 208 which is clamped within the notch 205 as by a nut 209. Preferably the surface adjacent the notches 205 on each of the handle mounting plates 190 and 191 is roughened as indicated by 210 in FIG. 15 to insure that the cam roller 206 is securely fastened to associated handle mounting plate.

Figures 18, 19:
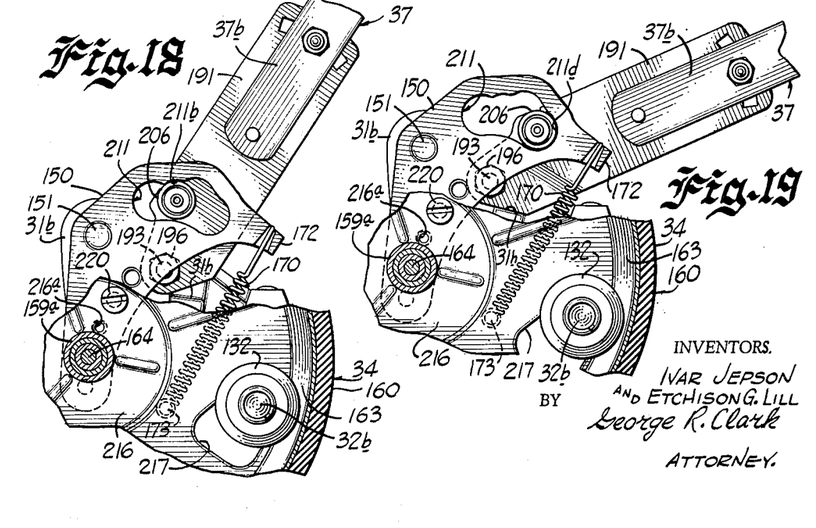
FIGS. 18 and 19 are fragmentary views with certain parts shown in section illustrating two different positions of the controls of the wheel drive mechanism of the present invention different from that shown in FIGS. 3 and 4 of the drawings.

It will be appreciated that to control the drive and no drive condition of the lawn mower 30 it is necessary pivotally to move the wheel mounting plates 149 and 150, and to this end each of the wheel mounting plates is provided with an elongated somewhat arcuate lobed opening 211, the configuration of which is clearly indicated in FIGS. 3, 13, 18, 19 and 20 of the drawings. This opening 211 has a plurality of lobes along the top edge thereof designated as 211a, 211b, 211c and 211d. The cam roller 206 is disposed in this opening whereby pivotal movement of the handle 36 causes rollers 206 to assume different positions in the openings 211 of the wheel mounting plates 149 and 150. As best shown in FIGS. 3 and 4 of the drawings the lobe 211c might be termed the driving lobe and when the cam roller is permitted to move within the confines of the lobe 211c as shown in FIGS. 3 and 4, the drive rollers 132 are biased into driving engagement with the associated drive channels 163 in the wheels 33 and 34 under the influence of the springs 170. The lobes 211c as indicated in FIGS. 3 and 4 of the drawings are sufficiently deep so that the cam rollers 206 do not engage the walls of openings 211 but instead drive rollers 132 and channels 163 limit the position of rollers 206. If however, the handle 36 is lowered slightly the cam rollers 206 are moved into the portion of opening 211 defined by the lobe 211d as clearly indicated in FIG. 19 of the drawings and this is the normal no drive position wherein the wheels 33 and 34 are pivoted out of driving engagement with the drive rollers 132. With the above described arrangement a slight downward force on the handle 36 from the position shown in FIG. 4 of the drawings interrupts the drive of wheels 33 and 34 and the cams 206 are held in lobes 211d by the detent action of the lobe configuration. If the operator prefers to terminate the driving of wheels 33 and 34 by an upward movement of the handle from the position shown in FIG. 4, this can also be accomplished as shown in FIG. 18 of the drawings where the rollers 206 are associated with the lobes 211b.

Figures 20, 22:
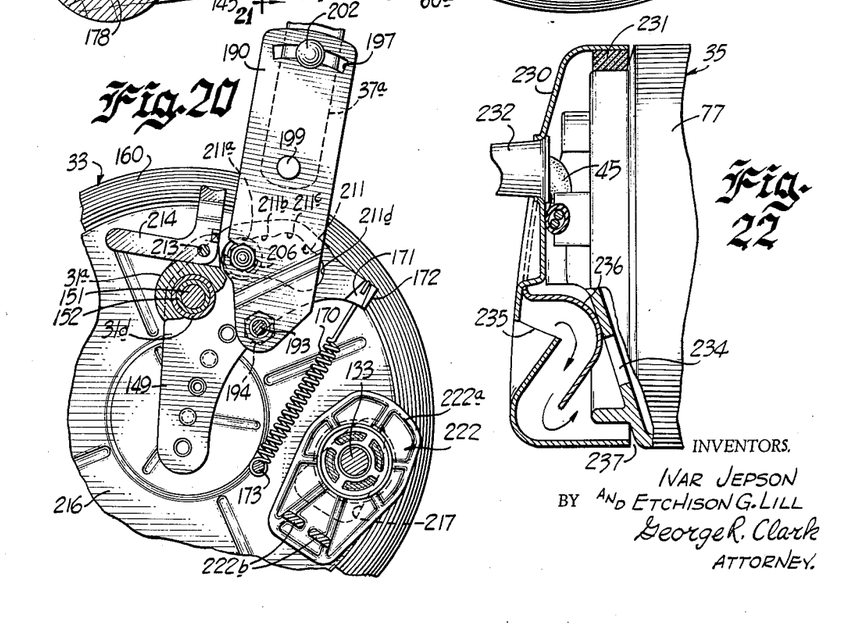
FIG. 20 is a fragmentary sectional view illustrating a particular position of the handle mechanism of the present invention still different from those shown in FIGS. 3, 18 and 19 of the drawings taken on line 20—20 of FIG. 2.
FIG. 22 is an enlarged view of one end of the motor housing partly in section showing the air cooling inlet, etc.

When the power cord is wrapped around the handle 36 including the cord storage bracket 55 as described above the weight of this cord may tend to pivot the mower in clockwise direction about the roller 177 as viewed in FIG. 3 of the drawings which is undesirable. To avoid this, the cam rollers 206 may be moved into the lobe 211a of the opening 211 as indicated in FIG. 20 of the drawings whereby the handle assembly 36 is in substantially a vertical position and the center of gravity of the entire lawn mower including the power cord is such that no danger of tipping over is involved. The detent action of lobes 211a insures that the handle, when in the position of FIG. 20, remains there until moved by the operator. An additional advantage of the vertical handle position is that less storage space for the mower is required. It should be appreciated that all positions of the rollers 206 except in lobes 211c are no drive positions.

Sometimes it is necessary to manipulate the lawn mower by lifting it over an obstruction or the like and this is accomplished by pushing down on the handle so as to lift the ground wheels off the ground whereby the entire weight of the mower is placed on the roller 177. To this end the handle is moved to the no drive position shown in FIG. 19 of the drawings wherein the handle mounting plates 190 and 191 engage shoulders 31h (FIGS. 18 and 19) integrally formed with the frame 31. These shoulders insure that the rollers 206 are not subjected to the force necessary to raise the wheels 33 and 34 off the ground to move the mower over an obstruction. In other words, the handle mounting plates 190 and 191 engage the shoulders 31h before the rollers 206 engage the ends of the openings 211.

On some occasions as when mowing on a hillside and going up hill it may be desirable to provide means to prevent the forward portion of the lawn mower from raising upwardly and tipping back upon itself. To this end as best shown in FIGS. 2 and 20 of the drawings there is provided an upstop 214 pivotally mounted to the end plate 31a of the frame 31 about a pivot point 213. This upstop 214 may be moved into engagement with the handle mounting plate 190 thereby to limit the relative upward movement of the handle assembly 36 to the frame 31.

For the purpose of preventing grass or other foreign matter from entering the wheels 33 and 34 and specifically so as not to interfere with the driving surface 163 and the drive rollers 132, there is provided for each wheel a grass shield 216 which comprises a stationary circular plate adapted to be interposed between the end plates of the frame 31 and the wheels 33 and 34 effectively to close the chamber defined between the concentric sleeves 159a and 161 as best shown in FIG. 12 of the drawings. These grass shields 216 are each provided with an enlarged opening 217 to accommodate the portion 32b of the shaft 32a with respect to ground wheel 34 and to accommodate the stub shaft 133 with respect to the ground wheel 33. The enlarged openings 217 are necessary to permit pivotal movement of the ground wheel mounting plates 149 and 150 when moving the handle 36 to the four positions determined by lobes 211a, 211b, 211c and 211d. The guards 216 are also provided with a central opening to accommodate the wheel axles 164. As illustrated they are also provided with an integral projection 216a which is receivable in one of the openings 165. In FIGS. 3 and 12 of the drawings the projection 216a is disposed in opening 165c but it might also be disposed in either of the openings 165b and 165d. In addition guards 216 are provided with an additional opening to accommodate a screw 220 (FIGS. 3 and 12) which secures each of the plates 216 to its associated end plate 31a or 31b. In FIGS. 3 and 12 of the drawings the screw 220 is indicated as threaded into opening 165d but it might also be disposed in either of the openings 165c or 165e depending upon the particular height of cut adjustment. It will be understood, from the above description that the openings 165a, 165b and 165c determine the three positions in which the axles 164 may be disposed. The openings 165d and 165e are necessary to accommodate projection 216a and fastening means 220.

With the arrangement described thus far it will be apparent that foreign matter could enter the chamber defined within each of the driving wheels 33 and 34 through the relatively large openings 217 and to this end there are provided a grass shield 222 for each end of mower 30 which shields are best shown in FIGS. 4, 5, 10, 12 and 20 of the drawings. These shields each comprise a flat plate portion 222a which is biased against the walls in the guards 216 defining the openings 217. As illustrated in the drawings each guard 216 has a narrow flange portion 216b surrounding the opening 217 against which flange the flat portion 222a of the associated shield 222 engages. It will be appreciated that the grass shield 222 must have a central opening for the shaft portion 32b or the stub shaft 133 as the case may be. A suitable coiled compression spring 224 concentric with the axis of shaft 32a and engageable with the C-washer 95 or at least with some means within the reel bearing supports 89 and 90 biases the grass shields 222 into engagement with the flange 216b surrounding the openings 217 in wheel guards 216 as is best shown in FIGS. 5 and 10 of the drawings. To prevent rotation of the grass shield 222 it is preferably provided with a pair of finger projections 222b which are disposed one on either side of one of the struts 88 as is best shown in FIG. 3 of the drawings.

For the purpose of maintaining the desired tension on the drive chain 119 there is provided as best shown in FIG. 6 of the drawings an adjusting screw 225 the end of which is adapted to be received in a recess 226 in the motor mounting bracket 70b. Preferably the top chain guard 122 is provided with a projection 122a defining a square recess 227 for receiving therein a square nut 228. Upon adjusting the screw 225 it is apparent that the motor supporting arm 70b will be pivoted in a clockwise direction as viewed in FIG. 6 of the drawings about the crossbar 31d which will tend to raise the power unit 35 and hence increase the tension on the chain 119. It will be appreciated that under these conditions the fastening means 75a and 75b must be released so that the supports 70a and 70b may be pivoted under the action of the adjusting screw 225. The adjusting screw 225 engages the bracket 70b closely adjacent the sprocket 85 which insures proper adjustment.

To protect the motor 71 and the reduction gear and overload clutch mechanism 72 against the entrance of water or moisture at the end of the housing where the power cord 45 and cooling air enter while still permitting the entrance of a stream of cooling air for cooling the motor 71, there is provided a motor end cap 230 (FIG. 22) which is suitably secured to the end of the motor housing 77 remote from gear housing 70. A gasket 231 is disposed in sealed relationship between the housing 77 and end cap 230. A suitable grommet 232 supported in the end cap 230 provides the waterproof entrance for the power cord 45. The end of the motor housing 77 associated with end cap 230 is provided with a plurality of openings, one of which, 234, is illustrated in FIG. 22 of the drawings. In accordance with the present invention, the end cap 230 is provided with labyrinth passageway including an air inlet opening 235 and a baffle 236 which causes the air to flow first upwardly and then downwardly as indicated by the arrows in FIG. 23 before entering the air inlet openings such as 234 in the motor housing 77. A small opening 237 at the bottom of the end cap 230 is provided to permit any water which could possibly enter the opening 235 to drain from the end cap 230 and not be carried into the motor housing 77. The power cord 45 is preferably provided with strain relief means identical with that fully disclosed in the copending Jepson application Serial No. 574,489 referred to above.

In view of the detailed descriptions included above, the operation of the lawn mower of the present invention will readily be understood by those skilled in the art. There has been provided a reel type lawn mower with improved means for insuring good shearing action between the reel and the associated cutter bar. A very lightweight frame for the lawn mower is provided and yet one which has great strength. Simple means are provided for making the necessary adjustments as to height of cut. In addition, a very simple arrangement is provided for causing the ground wheels to be driven.

While there has been shown and described a particular embodiment of the present invention, it will be apparent to those skilled in the art that various changes and modifications may be made without departing from the invention in its broader aspects, and it is therefore contemplated in the appended claims to cover all such changes and modifications as fall within the true spirit and scope of the present invention.

What is claimed as new and desired to be secured by Letters Patent of the United States is:

1. In a reel type lawn mower, a frame having end plates provided with horizontally aligned sockets, a cutter bar on said frame, a reel, bearing means on the ends of said reel, a pair of cylindrical supports mounting said bearing means eccentrically and fitting rotatably in said sockets, said supports being provided with peripherally disposed spaced teeth, and releasable clamping means on said end plates for holding said supports against rotation in said sockets, said end plates being provided with openings to said sockets for insertion of a prying tool into the spaces between said teeth.

2. The lawn mower of claim 1 in which said end plates are provided with bosses adjacent said sockets, including radially directed passageways extending to said sockets, and said releasable clamping means includes members movable in said passageways.

3. A reel type lawn mower comprising a frame having oppositely facing end plates connected by aligned parallel tubular members, each of said plates having an opening in a side wall thereof to permit insertion of a prying tool therethrough, a pair of supports having eccentric bores therein and mounted rotatably in said end plates, said supports being provided with projections against which the prying tool may bear to turn said supports in said end plates, bearing means mounted in said bores, a reel rotatably mounted in said bearing means, a cutter bar supported on said frame in shearing engagement with said reel and a pair of clamping shoes for clamping said supports against rotation in said plates, and screw means in said plates for rendering said clamping shoes effective.

4. A self propelled lawn mower comprising a frame having spaced parallel end plates interconnected by spaced hollow crossbars, a cutting member including a rotatable shaft journalled in said frame, a pair of wheel mounting plates one disposed at each end of said frame, means inserted into the ends of said hollow crossbars pivotally connecting said wheel mounting plates to said frame, a pair of ground wheels one operatively connected to each of said wheel mounting plates, and means driven directly by extensions on each end of said shaft frictionally engaging and driving said ground wheels.

5. A self propelled lawn mower comprising a frame having spaced parallel end plates interconnected by spaced hollow crossbars, a reel including a rotatable reel shaft journalled in said frame and disposed in parallel relationship with said crossbars, a pair of wheel mounting plates one disposed at each end of said frame, means inserted into the ends of said hollow crossbars pivotally connecting said wheel mounting plates to said frame, a pair of ground wheels one operatively connected to each of said wheel mounting plates, a friction drive channel defined on the inner periphery of each of said wheels, friction rollers connected to the ends of said shaft and disposed for engagement with said friction drive channels and means operative upon pivotal movement of said wheel mounting plates to drive said ground wheels from said reel shaft.

6. A lawn mower comprising a frame having spaced parallel end plates interconnected by spaced hollow crossbars, a cutting member including a rotatable shaft journalled in said frame, a pair of wheel mounting plates one disposed at each end of said frame, means inserted into the ends of said hollow crossbars pivotally connecting said wheel mounting plates to said frame, a pair of ground wheels one operatively connected to each of said wheel mounting plates, handle means pivoted to said frame, friction rollers mounted on said shaft, and means responsive to movement of said handle means completing a frictional driving connection between said rollers and said ground wheels.

7. The lawn mower of claim 6 wherein a prime mover is supported on said frame and means are provided for driving said shaft from said prime mover.

8. A reel type lawn mower comprising a frame including a pair of parallel disposed end plates, a cutter bar, a reel having a shaft journalled in said end plates in shearing engagement with said cutter bar, a pair of ground wheel supports pivotally connected one to each of said end plates, means defining an opening in at least one of said supports, handle means pivotally secured to said frame, cam means movable with said handle means and disposed in said opening, ground wheels secured to said supports for supporting said frame through said supports, and a drive roller connected to said shaft, at least one of said wheels being movable into frictional driving engagement with said drive roller upon pivotal movement of said handle means relative to said frame.

9. A lawn mower comprising a frame cutting means including a shaft journalled in said frame, a pair of wheel mounting plates pivotally connected to said frame, means defining an opening in at least one of said plates, handle means pivotally secured to said frame, cam means movable with said handle means and disposed in said opening, ground wheels secured to said plates for supporting said frame through said plates, and a drive roller connected to said shaft, at least one of said wheels being movable into frictional driving engagement with said drive roller upon pivotal movement of said handle means relative to said frame.

10. The lawn mower of claim 9 wherein said cutting means includes a reel and said drive roller is connected to said reel shaft.

11. The lawn mower of claim 9 wherein said cam means is a roller and said opening is a multi-lobed opening, one lobe defining a driving position for said wheels and the other lobes defining no drive positions.

12. A reel type lawn mower comprising a frame including a pair of parallel disposed end plates, a reel having a shaft journaled in said end plates, a pair of ground wheel mounting plates pivotally connected to one to each of said end plates means defining a multilobed elongated opening in at least one of said mounting plates, handle means pivotally secured to said frame, roller means movable with said handle means and disposed in said opening, ground wheels secured to said mounting plates for supporting said frame through said mounting plates, and a drive roller connected to said shaft, at least one of said wheels being movable into frictional driving engagement with said drive roller upon pivotal movement of said handle means relative to said frame, the lobes of said opening defining detent means to retain said roller means in a plurality of different positions.

13. The lawn mower of claim 12 wherein one of said lobes defines a drive position, and the others of said lobes define no drive positions of said mower, and wherein one of said other lobes also defines a mower storage position.

14. The lawn mower of claim 5 wherein grass shields are provided for each wheel to prevent grass from entering said friction drive channels, said grass shields having enlarged openings therein for receiving the ends of said shaft surrounding said friction drive rollers, and additional grass shields surrounding the ends of said shaft and biased into engagement with the walls defining said openings for closing said openings.

References Cited in the file of this patent

UNITED STATES PATENTS

| | | |
|---|---|---|
| 1,511,040 | Ramsey | Oct. 7, 1924 |
| 1,866,380 | Wagner | July 5, 1932 |
| 1,907,005 | Risser | May 2, 1933 |
| 2,055,724 | Irgens | Sept. 29, 1936 |
| 2,151,659 | Funk | Mar. 21, 1939 |
| 2,247,333 | Funk | June 24, 1941 |
| 2,378,488 | Loewe et al. | June 19, 1945 |
| 2,547,401 | Loewe et al. | Apr. 3, 1951 |
| 2,566,724 | Heil | Sept. 4, 1951 |
| 2,624,169 | Cole | Jan. 6, 1953 |
| 2,651,904 | Jatunn | Sept. 15, 1933 |
| 2,723,524 | Elliott | Nov. 15, 1955 |
| 2,730,374 | Rogers et al. | Jan. 10, 1956 |
| 2,786,321 | Lill | Mar. 26, 1957 |
| 2,836,949 | Cole et al. | June 3, 1958 |
| 2,861,333 | Morin et al. | Nov. 25, 1958 |
| 2,871,644 | Mott | Feb. 3, 1959 |